UNITED STATES PATENT OFFICE.

CARLETON ELLIS, OF LARCHMONT, NEW YORK, ASSIGNOR TO ELLIS-FOSTER COMPANY, A CORPORATION OF NEW JERSEY.

MAGNESIA CEMENT.

No. 909,171.   Specification of Letters Patent.   Patented Jan. 12, 1909.

Application filed December 30, 1907. Serial No. 408,487.

*To all whom it may concern:*

Be it known that I, CARLETON ELLIS, a citizen of the United States, residing at Larchmont, in the county of Westchester and State of New York, have invented certain new and useful Improvements in Magnesia Cement, of which the following is a specification.

This invention relates to cement material in the form of a dry powder comprising oxid of magnesia, and the like, and has for its object a cement material which will set to a hard tough stone-like composition merely by the addition of water.

The present adaptations of the old Sorel cement composition generally call for the admixture of oxid of magnesia with sawdust, infusorial earth, sand and the like, together with coloring matter, and in the admixture with this dry powder of a concentrated aqueous solution of chlorid of magnesium at the point where the cement is to be used.

The employment of solutions of magnesium chlorid has often times been found disadvantageous and objectionable, and more or less endeavor has been made to secure a cement which is light in color, or may be delicately tinted, that will set properly on admixture with water; hence the efforts to produce a white Portland cement; also the employment of barium chlorid and magnesium sulfate and magnesia oxid in admixture. In spite of the fairly satisfactory white Portland cements which have been produced, there are not obtainable with these mixtures solid objects which have the degree of translucency desired for some purposes, and my composition, as hereinafter described, affords a material which has this desirable property.

My composition consists of a dry substantially non-hydroscopic powder, comprising oxid of magnesia, or equivalent oxid, and saline bodies capable of gradually reacting in the presence of water to form magnesium chlorid, or equivalent compound. Adaptation may also be made of the same procedure to the production of cements containing oxid of calcium; or with oxid of zinc, alumina, etc., for dental fillings; all with or without fibrous material such as sawdust or asbestos.

In order to eliminate the use of the liquid solutions of chlorid, I employ with the oxid of magnesia, dry materials which are capable of gradually reacting to form chlorids, as for instance, a mixture of common salt and sulfate of magnesia, or of common salt and sulfate of zinc, or of potassium chlorid and sulfate of magnesia, and the like. The reaction of the components of such mixtures produces magnesium chlorid and sodium sulfate; a reaction which normally progresses only to a certain inconsiderable point, and quantitatively, the formation of magnesium chlorid being dependent on the mass or concentration of the sodium chlorid and magnesium sulfate.

The coöperation of two principles is secured in the present composition, namely, the law of mass action, which indicates the product of any reaction as proportional to the masses of the reacting constituents, and second, the law of segregation, which indicates that the removal of a body from the field of reaction through precipitation, or otherwise, will allow an otherwise incomplete reaction to progress to completion. Hence, with mixtures of sodium chlorid, magnesium sulfate and magnesium oxid, the magnesium chlorid formed in small amount by wetting the mixture with water soon combines with the magnesium oxid to form the rather insoluble oxy chlorid of magnesium; thus removing the previously formed magnesium chlorid from the field of reaction. Consequently magnesium chlorid must be formed anew to supply the void, as it may be termed, and this so formed chlorid, in turn combines with additional oxid of magnesia, and thus the reaction continues until a large proportion of the chlorid has combined with the magnesia.

Suitable compositions illustrating my invention are made by mixing,

Common salt, dried and powdered ......................... 1 lb.
Sulfate of magnesia ........ 1 lb.
Oxid of magnesia .......... 10 lbs.

Another formula consists of,

Common salt, dried and powdered ......................... 2 lbs.
Magnesium sulfate ........ 1½ lbs.
Magnesium oxid .......... 10 lbs.
Sand ..................... 4 lbs.
Sawdust .................. 1 lb.
Color .................... ½ lb.

The above formulæ illustrate the character of my invention, but it should be understood that variations may be made to a considerable extent, depending on the character of the material desired, and also on the purity of the chemicals employed. The substitution of zinc oxid and sulfate in the above formulæ affords very hard cements. In the case of the common salt mixtures, it should be borne in mind that the mass action of the salt is an important factor in the production of a firmly setting translucent cement.

The cements above illustrated may be prepared in the form of dry powders and are ready for use merely by the admixture of sufficient water to produce a plastic mass. Calcined gypsum, etc., may be added to modify the set.

Various other sulfates than those enumerated may be used, as well as various chlorids, the object being to provide metathetically reacting materials, which give rise to the gradual production of the oxy chlorid of magnesia when water is added thereto.

What I claim is:—

1. A dry substantially non-hydroscopic powder, comprising oxid of magnesium and saline bodies capable of gradually reacting in the simultaneous presence of water, and said oxid to form chlorid of magnesium; whereby setting qualities are conferred upon the composition, due to the formation of oxy chlorid of magnesium.

2. A dry substantially non-hydroscopic powder, comprising oxid of magnesium and saline bodies capable of slowly metathetically reacting in the presence of water, and said oxid, to form magnesium chlorid.

3. A dry powder capable of setting on the addition of water, to form a hard translucent material, which comprises a metallic oxid such as the oxid of magnesium or zinc, and saline bodies capable of reacting in the presence of water and said oxid, to form a chlorid; whereby oxy chlorids are produced conferring setting properties upon the composition.

4. As a cement composition, a dry powder, comprising oxid of magnesium and a salt such as magnesium sulfate, together with a substantial amount of an alkali chlorid such as sodium chlorid.

5. As a cement composition, a dry powder, comprising a mixture of oxid of magnesium, sulfate of magnesium and chlorid of sodium.

6. A cement composition, comprising oxid of magnesium with approximately equal parts of sodium chlorid and magnesium sulfate.

7. A cement composition, comprising oxid of magnesium, sulfate of magnesium, a substantial amount of chlorid of sodium, sand and a fibrous material such as sawdust or asbestos.

8. A cement material suitable for flooring, wall plaster and the like, consisting of a dry substantially non-hydroscopic powder, comprising fibrous material such as sawdust and asbestos incorporated with magnesium oxid, magnesium sulfate and sodium chlorid.

9. As a cement composition, a dry powder, comprising oxid of magnesium and a salt such as magnesium sulfate, together with a substantial amount of an alkaline chlorid such as sodium chlorid; all free from alkaline earth chlorids.

In testimony whereof I have affixed my signature in presence of two witnesses.

CARLETON ELLIS.

Witnesses:
NATHANIEL L. FOSTER,
HENRIETTA BERKWITZ.